Patented Feb. 23, 1943

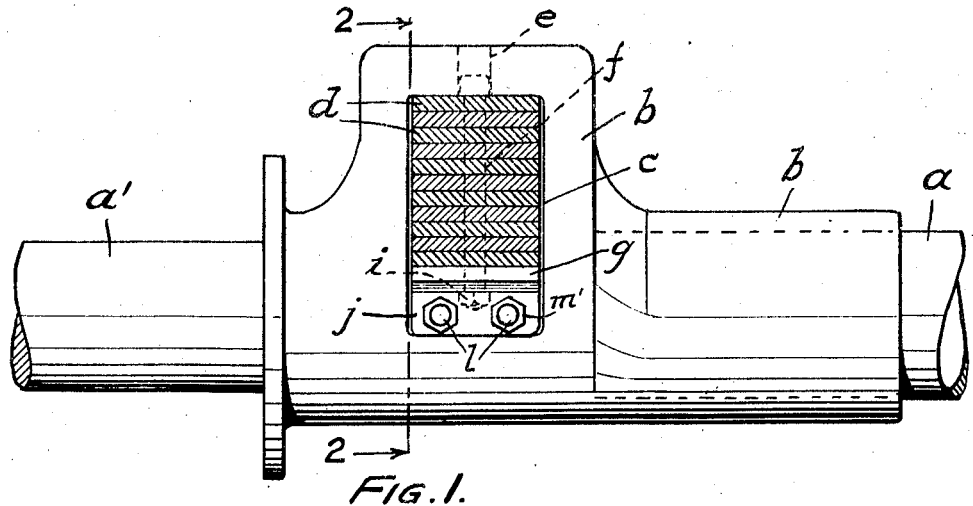
FIG. 1.
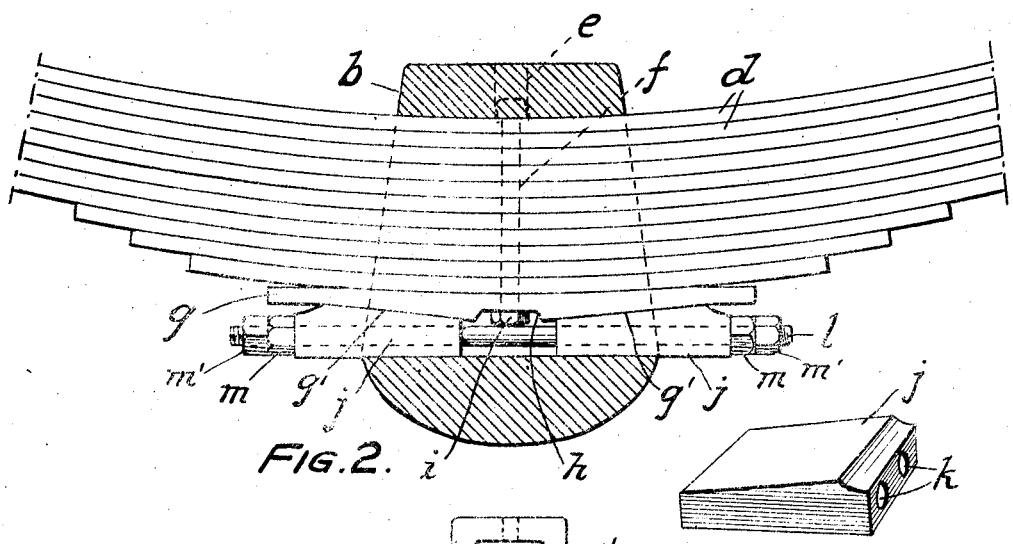
FIG. 2.
FIG. 3.
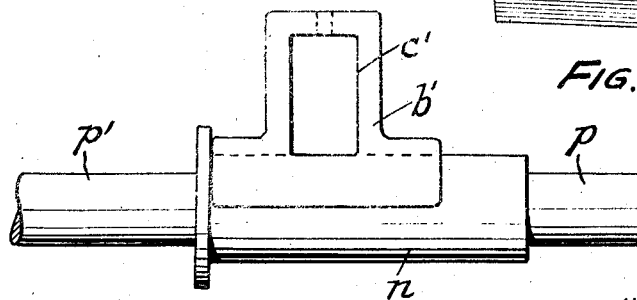
FIG 4.
INVENTOR
James W. Hingley
BY
ATTORNEYS.

2,312,163

UNITED STATES PATENT OFFICE 2,312,163

VEHICLE SPRING LOCK

James W. Hingley, Chester, Pa.

Application April 14, 1941, Serial No. 388,369

2 Claims. (Cl. 267—52)

This invention relates to a vehicle spring lock and more particularly to a lock for securing a spring to the axle of a vehicle.

Heretofore it has been customary to secure springs to the axles of vehicles by means of U bolts arranged to secure the springs to seats secured to or cast integral with the axle housings in the case of live axles, or to the axles in the case of dead axles.

Such means for securing or locking springs to axles have proved substantially unsatisfactory due to the fact that in operation the U bolts tend to stretch and the springs become loose on their seats and tend to break when subjected to strain.

Now in accordance with this invention, a lock is provided for securing springs to axles which will be positive in action, will not become loose in operation and, at the same time, will be simple and inexpensive to construct and install.

Having now indicated in a general way the nature and purpose of this invention, I will proceed to a detailed description of a preferred embodiment thereof with reference to the accompanying drawing, in which:

Figure 1 is a side view, partly in section and partly broken away, showing an embodiment of this invention for locking a spring to a vehicle axle.

Figure 2 is a sectional view taken on line 2—2, Figure 1.

Figure 3 is a perspective view showing an element of the lock.

Figure 4 is a side view of a modified form of the structure shown in Figure 1.

Referring more particularly to Figures 1-3, $a$, $a'$ indicate portions of a dead axle, the portion $a$ being adapted to receive wheel bearings and a wheel and the portion $a'$ extending intermediate the wheels of a vehicle. The axle portions $a$, $a'$ are connected by a spring seat member $b$, which may be welded to the axle portions or, if they be cast or forged, may be cast or forged integral with them.

The spring seat member $b$ is provided with an aperture $c$ for the reception of a vehicle spring $d$, of usual construction, comprising a plurality of leaves, and with an aperture $e$ in its top opening centrally of the aperture $c$.

The leaves forming the spring $d$ are secured together by means of a tie bolt $f$, extending centrally of the leaves and which also serve to secure a plate or spring chair $g$ to the underside of the spring.

The upper face of the chair $g$ conforms to the underside of the spring $d$, while its underside is oppositely tapered or wedge shaped, as at $g'$, $g'$, from a central countersink $h$ adapted to receive the nut $i$ on the bolt $f$.

A pair of identical wedges $j$, $j$, having longitudinal apertures $k$, $k$, one of which is shown in Figure 3, is provided for securing the spring to seat member $b$ and effectively locking it in position.

In assembling a spring with an axle, the chair $g$ is secured to the underside of the spring $d$ by means of the bolt $f$, which, as will be appreciated, also serves to secure the spring leaves together.

The spring is passed through the aperture $c$ in member $b$ and centered by entry of the upper end of the bolt $f$ and its nut into the aperture $e$, which opens into the aperture $c$. The wedge members $j$, $j$ are then positioned oppositely between the underside of the chair $g$ and the bottom of the aperture $c$ in the seat member, with their wedge surfaces opposite to the surfaces $g'$, $g'$ on the under side of the chair.

The bolts $l$, $l$ are then passed through the apertures $k$, $k$ in the wedge-shaped members $j$, $j$ and the wedge-shaped members are drawn together by means of nuts $m$, $m$ applied to the bolts $l$, $l$, until the spring is securely locked to the seat member, when the nuts $m$, $m$ are locked by means of lock nuts $m'$, $m'$.

Referring now more particularly to Figure 4, in which a modification of the device shown in Figures 1-3 is shown, a spring seat member $b'$ provided with an aperture $c'$ is formed separately and welded to the axle housing $n$ enclosing a live axle $p$, the end portion of which $p'$ is adapted for the reception, in the usual manner, of a wheel.

In the modification shown in Figure 4 a spring $d$, to which is secured a chair $g$, is extended through the aperture $c'$ and is securely locked by means of wedge members $j$, $j$, as in the embodiment shown in Figures 1-3.

It will be appreciated that by means of the spring lock above described a vehicle spring may be readily installed and securely locked with respect to a spring seat, with elimination of the possibility of loosening in the course of operation of the vehicle.

It will be noted that the spring member is locked in the seat by means of the opposite wedging action of the wedges $j$, $j$ in cooperation with the surfaces $g'$, $g'$ formed on the underside of the plate or chair $g$, which is secured to the spring.

The wedging action of the members $j, j$ is directed from opposite directions and is, therefore, uniform. The wedge members $j, j$ cannot become loose in operation of the spring. Hence, the spring is permanently locked and breakage of the spring due to loosening is obviated.

It will be appreciated that various modification in detail may be made in the structure described above for purposes of illustration without departing from the scope of this invention as defined in the appended claims.

What I claim and desire to protect by Letters Patent is:

1. In combination a spring supporting member provided with an aperture for the reception of a vehicle spring, a second aperture at right angle thereto, a vehicle leaf spring extending through said first aperture, a spring leaf tie bolt extending through said spring and into said aperture in the supporting member at right angle to the aperture through which said spring extends, a pair of wedge members arranged respectively to exert a wedging action between the spring and the supporting member from opposite ends of said aperture through which said spring extends and means engaging said wedge members for drawing them together.

2. In combination a spring supporting member provided with an aperture for the passage of a spring and with a second aperture at right angles thereto, a vehicle leaf spring having a spring leaf tie bolt extending through said first mentioned aperture, the said tie bolt extending into said second aperture, a plate independent of said supporting member and having an aperture for the reception of said tie bolt, said plate extending through said aperture through which said spring extends and having one of its surfaces bearing on the under side of said spring and having oppositely extending tapered surfaces formed on its opposite surface and a pair of wedge members arranged oppositely to bear on said tapered surfaces of said plate respectively and exert a wedging action between said plate and said supporting member.

JAMES W. HINGLEY.